(12) United States Patent
Mizuochi et al.

(10) Patent No.: US 7,557,750 B2
(45) Date of Patent: Jul. 7, 2009

(54) POSITIONING DEVICE, METHOD OF CONTROLLING POSITIONING DEVICE, AND RECORDING MEDIUM

(75) Inventors: Shunichi Mizuochi, Matsumoto (JP); Yoshiyuki Muraguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 11/882,734

(22) Filed: Aug. 3, 2007

(65) Prior Publication Data
US 2008/0051999 A1 Feb. 28, 2008

(30) Foreign Application Priority Data
Aug. 25, 2006 (JP) ............... 2006-228770

(51) Int. Cl.
*G01S 5/14* (2006.01)
*G01S 1/00* (2006.01)

(52) U.S. Cl. ............... 342/357.13; 342/357.02; 342/357.06

(58) Field of Classification Search ........... 342/357.13, 342/357.02, 357.06
See application file for complete search history.

(56) References Cited

U.S. PATENT DOCUMENTS

| | | | |
|---|---|---|---|
| 5,210,540 A | | 5/1993 | Masumoto |
| 6,590,530 B2* | | 7/2003 | van Diggelen et al. . 342/357.13 |
| 7,158,883 B2* | | 1/2007 | Fuchs et al. ............ 701/213 |
| 2006/0271294 A1 | | 11/2006 | Mizuochi |

FOREIGN PATENT DOCUMENTS

| | | |
|---|---|---|
| EP | 0 915 321 A2 | 5/1999 |
| EP | 1 531 338 A2 | 5/2005 |
| EP | 1 726 971 A1 | 11/2006 |
| JP | H06-75103 B2 | 9/1994 |
| JP | H08-68651 A | 3/1996 |
| JP | 2002-341012 A | 11/2002 |
| JP | 2006-329705 A | 12/2006 |

* cited by examiner

*Primary Examiner*—Thomas H Tarcza
*Assistant Examiner*—Harry Liu
(74) *Attorney, Agent, or Firm*—Global IP Counselors, LLP

(57) ABSTRACT

A positioning device includes an estimated height storage section which stores an estimated height H1, a signal reception section which receives a satellite signal which is a signal from a satellite positioning system (SPS) satellite, a two-dimensional height calculation section which calculates a two-dimensional height H2c by two-dimensional positioning using the estimated height H1, a three-dimensional height calculation section which calculates a three-dimensional height H2b by preliminary three-dimensional positioning during two-dimensional positioning, a height selection section which selects the two-dimensional height H2b or the three-dimensional height H2c in order to update the estimated height H1, and an updating section which updates the estimated height H1 with the two-dimensional height H2b or the three-dimensional height H2c selected by the height selection section.

10 Claims, 12 Drawing Sheets

FIG. 1
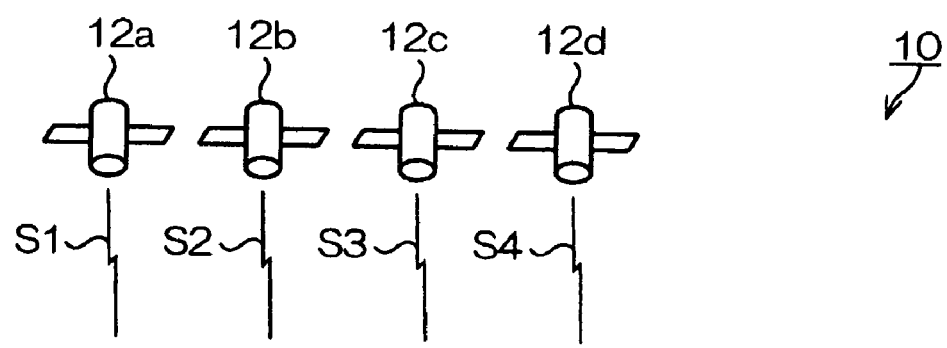
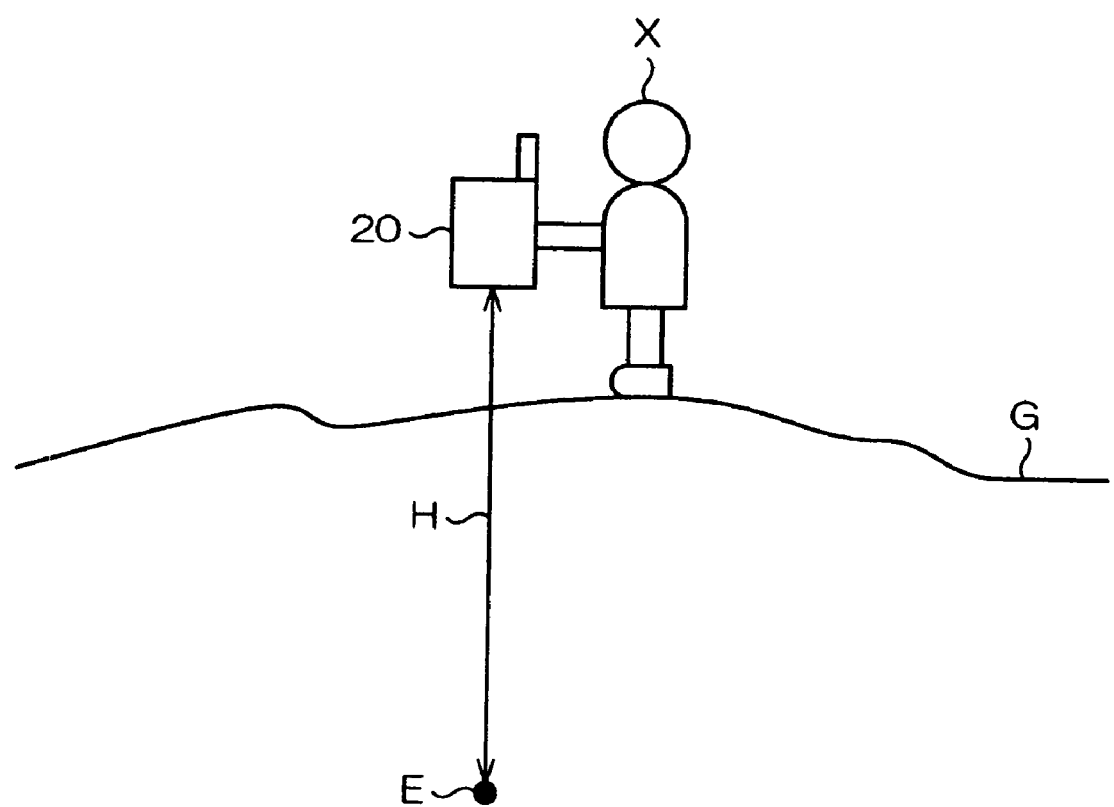

FIG. 4

| | |
|---|---|
| SEARCH MODE M1 | : OPERATION MODE FOR WIDE FREQUENCY RANGE |
| FIRST TRACKING MODE M2 | : OPERATION MODE WHEN SIGNAL STRENGTH IS HIGH (−139 dBm OR MORE) ACCUMULATION TIME t1 |
| SECOND TRACKING MODE M3 | : OPERATION MODE WHEN SIGNAL STRENGTH IS LOW (−160 dBm OR MORE AND LESS THAN −139 dBm) ACCUMULATION TIME t2 |

| STRONG ELECTRIC FIELD | FIRST STRONG ELECTRIC FIELD: $a1$ OR MORE AND LESS THAN $a2$<br>SECOND STRONG ELECTRIC FIELD: $a2$ OR MORE AND LESS THAN $a3$<br>THIRD STRONG ELECTRIC FIELD: $a3$ OR MORE<br>$a1 < a2 < a3$ |
|---|---|
| WEAK ELECTRIC FIELD | FIRST WEAK ELECTRIC FIELD: $b1$ OR MORE AND LESS THAN $b2$<br>SECOND WEAK ELECTRIC FIELD: $b2$ OR MORE AND LESS THAN $b3$<br>$b1 < b2 < b3$ |

FIG. 6

| ENVIRONMENT DETERMINATION PROGRAM 118 | POSITIONING SPECIFICATION |
|---|---|
| FIRST ENVIRONMENT (OPEN SKY): M2 SATELLITE WITH THIRD STRONG ELECTRIC FIELD IS 8 OR MORE AND ALL | POSITIONS USING ALL MEASUREMENT |
| SECOND ENVIRONMENT (QUASI-OPEN SKY): M2 SATELLITE WITH THIRD STRONG ELECTRIC FIELD, M2 SATELLITE WITH SECOND STRONG ELECTRIC FIELD, M3 SATELLITE | POSITIONS EXCLUDING M3 SATELLITES MEASUREMENT |
| THIRD ENVIRONMENT (FIRST MULTIPATH ENVIRONMENT): M2 SATELLITE WITH FIRST STRONG ELECTRIC FIELD, M2 SATELLITE WITH SECOND STRONG ELECTRIC FIELD, M3 SATELLITE | POSITIONS WITH MULTIPATH MEASUREMENT |
| FORTH ENVIRONMENT (BIASED): M2 SATELLITE WITH THIRD STRONG ELECTRIC FIELD, M3 SATELLITE WITH SECOND WEAK ELECTRIC FIELD, BIASED PDOP | POSITIONS EXCLUDING BIAS AND OPPOSITE DIRECTION SATELLITE MEASUREMENT |
| FIFTH ENVIRONMENT (VALLEY): M2 SATELLITE WITH THIRD STRONG ELECTRIC FIELD, M3 SATELLITE WITH SECOND WEAK ELECTRIC FIELD, NO BIASED PDOP | POSITIONS EXCLUDING OBSTACLE DIRECTION MEASUREMENT AND M3 SATELLITE WITH SECOND WEAK ELECTRIC FIELD |
| SIXTH ENVIRONMENT (SECOND MULTIPATH): M3 SATELLITES LARGER THAN M2 SATELLITES | POSITIONS WITH MULTIPATH MEASUREMENT (INCLUDING M2 SATELLITE MEASUREMENT) |
| SEVENTH ENVIRONMENT (THIRD MULTIPATH): ONE M2 SATELLITE AND M3 SATELLITES | POSITIONS WITH MULTIPATH MEASUREMENT (CORRECTS MEASUREMENT ACCURACY) |
| EIGHTH ENVIRONMENT (SECOND WEAK ELECTRIC FIELD): ONLY M3 SATELLITES WITH SECOND WEAK ELECTRIC FIELD | POSITIONS USING ALL MEASUREMENTS |
| NINTH ENVIRONMENT (FIRST WEAK ELECTRIC FIELD): ONLY M3 SATELLITES WITH FIRST WEAK ELECTRIC FIELD | POSITIONS WITH INCREASED CUMULATIVE TIME |

| GAIN COUNTER | 0 | 1 | 2 | 3 | 4 | 5 | 6 | 7 | 8 | 9 |
|---|---|---|---|---|---|---|---|---|---|---|
| GAIN | 1 | 1.5 | 2 | 2.5 | 3 | 3.5 | 4 | 4.5 | 5 | 5.5 |

HELD HEIGHT H1 (ESTIMATED HEIGHT)

GAIN 5.5
GAIN 5
GAIN 4
GAIN 3
GAIN 2
GAIN 1

HEIGHT H2

| GAIN COUNTER | 0 | 1 | 2 | 3 | 4 | 5 | 6 | 7 | 8 | 9 |
|---|---|---|---|---|---|---|---|---|---|---|
| GAIN | 1 | 1 | 2 | 2 | 3 | 3 | 4 | 4 | 5 | 5 |

POSITIONING DEVICE, METHOD OF CONTROLLING POSITIONING DEVICE, AND RECORDING MEDIUM

Japanese Patent Application No. 2006-228770 filed on Aug. 25, 2006, is hereby incorporated by reference in its entirety.

BACKGROUND OF THE INVENTION

The present invention relates to a positioning device which utilizes signals from positioning satellites, a method of controlling a positioning device, and a recording medium.

A positioning system has been used in practice which locates the present position of a GPS receiver utilizing a satellite positioning system (SPS) such as a global positioning system (GPS).

The GPS receiver receives signals from GPS satellites and calculates the distance between each GPS satellite and the GPS receiver (hereinafter called "pseudo-range") based on the difference between the time at which the signal is transmitted from each GPS satellite and the time at which the signal reaches the GPS receiver (hereinafter called "delay time"). The GPS receiver calculates (locates) the present position using the pseudo-range and satellite orbital information of each GPS satellite contained in the signal received from each GPS satellite.

When the GPS receiver can receive signals from four or more GPS satellites, the GPS receiver can perform three-dimensional positioning which calculates the latitude, the longitude, and the height of the present position.

When the GPS receiver can receive signals from three GPS satellites, the GPS receiver can perform two-dimensional positioning which calculates the latitude and the longitude of the present position. For example, the GPS receiver regards the center of the earth as one GPS satellite, and uses the distance between the center of the earth and the present position as the pseudo-range. The GPS receiver then calculates (locates) the position in the same manner as in three-dimensional positioning. Therefore, the GPS receiver must hold the height information of the present position in advance when performing two-dimensional positioning.

A two-dimensional positioning technology using the height acquired from map data (e.g. JP-A-2002-341012) and a two-dimensional positioning technology using the height calculated during the preceding positioning using a set of GPS satellites with the minimum vertical dilution of precision (VDOP) or the height calculated during the preceding three-dimensional positioning (e.g. JP-B-6-75103) have been proposed.

However, the load imposed on storage means is increased when holding the map data. Moreover, the height information obtained from the map data may have a large error.

When using the height calculated during the preceding positioning using a set of GPS satellites with the minimum VDOP, the height may have a large error due to poor positioning conditions (e.g. environment in which the signal strength is weak or environment in which multipaths occur to a large extent) during the preceding positioning. When using the height calculated during the preceding three-dimensional positioning, the height may also have a large error due to poor positioning conditions during the preceding positioning The applicant of the invention has filed a patent application regarding technology of updating the height information taking the conditions during the preceding positioning into consideration (Japanese Patent Application No. 2005-151048 (published as JP-A-2006-329705)). However, since this technology updates the height information when the three-dimensional height information has specific reliability, the height information cannot be updated when the three-dimensional height information has low reliability (e.g. multipath environment). This poses a problem in which the height information may not be promptly updated.

SUMMARY

According to one aspect of the invention, there is provided a positioning device comprising:

an estimated height storage section which stores an estimated height;

a signal reception section which receives a satellite signal which is a signal from a satellite positioning system (SPS) satellite;

a two-dimensional height calculation section which calculates a height of a present position as a two-dimensional height by performing two-dimensional positioning which locates the present position based on the received satellite signals using the estimated height as a distance from the center of the earth;

a three-dimensional height calculation section which calculates the height of the present position as a three-dimensional height by performing preliminary three-dimensional positioning which preliminarily locates the present position based on the received satellite signals without using the estimated height when performing the two-dimensional positioning;

a height selection section which selects the two-dimensional height or the three-dimensional height for updating the estimated height stored in the estimated height storage section; and an updating section which updates the estimated height stored in the estimated height storage section using the two-dimensional height or the three-dimensional height selected by the height selection section.

BRIEF DESCRIPTION OF THE SEVERAL VIEWS OF THE DRAWING

FIG. 1 is a schematic view showing a positioning system according to one embodiment of the invention.

FIG. 4 is a view showing an example of the operation mode of the terminal.

FIG. 5 is a view illustrative of a process based on an environment determination program.

FIG. 6 is a view illustrative of a process based on the environment determination program.

DETAILED DESCRIPTION OF THE EMBODIMENT

Figure 2:
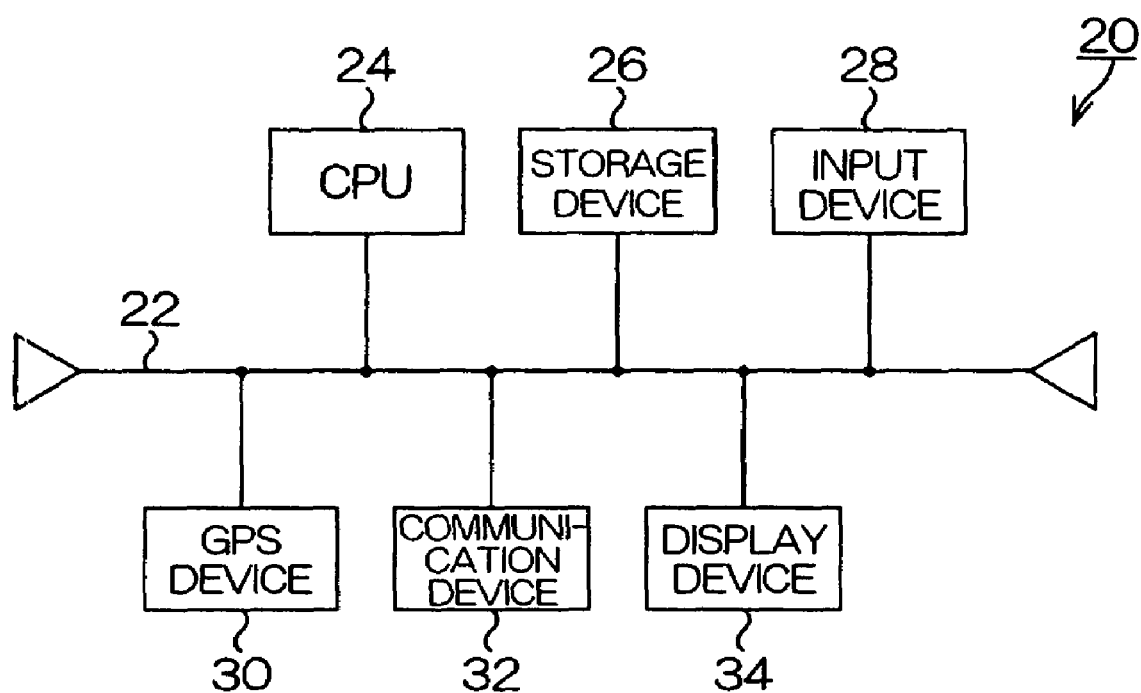
FIG. 2 is a schematic view showing the main hardware configuration of a terminal.

The invention may allow a reduction in load imposed on the storage for holding the height data, ensures acquisition of accurate height information used for two-dimensional positioning while reducing the effects of poor positioning conditions during the preceding positioning, and allows the height information to be promptly updated.

According to one embodiment of the invention, there is provided a positioning device comprising:

an estimated height storage section which stores an estimated height;

a signal reception section which receives a satellite signal which is a signal from a satellite positioning system (SPS) satellite;

a two-dimensional height calculation section which calculates a height of a present position as a two-dimensional height by performing two-dimensional positioning which locates the present position based on the received satellite signals using the estimated height as a distance from the center of the earth;

a three-dimensional height calculation section which calculates the height of the present position as a three-dimensional height by performing preliminary three-dimensional positioning which preliminarily locates the present position based on the received satellite signals without using the estimated height when performing the two-dimensional positioning;

a height selection section which selects the two-dimensional height or the three-dimensional height for updating the estimated height stored in the estimated height storage section; and an updating section which updates the estimated height stored in the estimated height storage section using the two-dimensional height or the three-dimensional height selected by the height selection section.

According to the above embodiment, since the positioning device includes the two-dimensional height calculation section, the two-dimensional height can be calculated. Therefore, the positioning device can calculate the height even when three-dimensional positioning cannot be performed or the reliability of the positioning results obtained by three-dimensional positioning is insufficient (hereinafter called "when three-dimensional positioning is not appropriate").

Since the positioning device includes the three-dimensional height calculation section, the three-dimensional height can be calculated by performing preliminary three-dimensional positioning during two-dimensional positioning. There may be a case where three-dimensional positioning is possible even if three-dimensional positioning is not appropriate. The three-dimensional height may be appropriate for updating the estimated height even if two-dimensional positioning is appropriate for calculating the located position. Therefore, the positioning device calculates the two-dimensional height and the three-dimensional height. This increases the degrees of freedom of selection of the height for updating the estimated height.

The term "two-dimensional positioning" used herein means calculating the height in addition to the latitude and the longitude. The term "two-dimensional positioning" used herein refers to one type of three-dimensional positioning which calculating the latitude, the longitude, and the height. In three-dimensional positioning, the position is located using the positions of four or more satellites in the orbits and the pseudo-range between each satellite and the positioning device. In two-dimensional positioning, the center of the earth is regarded as one satellite and used for positioning. Specifically, two-dimensional positioning locates the position on the assumption that the estimated height is the pseudo-range between the center of the earth and the positioning device. Therefore, two-dimensional positioning exhibits higher positioning accuracy when the estimated height has high accuracy.

However, since it is considered that the true height changes in a reception state such as a state in which the positioning device moves at a velocity equal to or higher than a specific velocity, three-dimensional positioning which does not use the estimated height ensures excellent followability to the true movement state to exhibit high positioning accuracy.

Therefore, even if the estimated height has high accuracy, three-dimensional positioning exhibits high accuracy in comparison with two-dimensional positioning depending on the reception state.

Since the positioning device includes the height selection section, the positioning device can select the two-dimensional height or the three-dimensional height in order to update the estimated height depending on the reception state during two-dimensional positioning.

Since the positioning device includes the updating section, the positioning device can update the estimated height using the two-dimensional height or the three-dimensional height. Specifically, even if three-dimensional positioning is not appropriate, the positioning device can update the estimated height using the two-dimensional height or the three-dimensional height. Therefore, the positioning device can promptly update the estimated height.

Since the two-dimensional height and the three-dimensional height are new information generated by positioning, the estimated height which has been held is corrected by new information by updating the estimated height with the two-dimensional height or the three-dimensional height. This enables the estimated height to be made closer to the true height. Moreover, since the positioning device can calculate the two-dimensional height and the three-dimensional height and select a more appropriate height, the estimated height can be further made closer to the true height.

The height close to the true height is called an accurate height. Information indicating the height close to the true height is called accurate height information.

Since the positioning device can hold and update only one estimated height using the updating section, the load imposed on the storage for holding height data is reduced.

Therefore, the positioning device allows accurate height information used for two-dimensional positioning to be acquired while reducing the storage load for holding height data and reducing the effects of poor positioning conditions during the preceding positioning, and allows the height information to be promptly updated.

The positioning device may comprise:

a three-dimensional positioning section which performs three-dimensional positioning which locates the present position based on the received satellite signals without using the estimated height;

a positioning environment determination section which determines a positioning environment when performing the two-dimensional positioning or the three-dimensional positioning; and a positioning method selection section which selects the two-dimensional positioning or the three-dimensional positioning based on the positioning environment;

wherein the updating section may update the estimated height using the three-dimensional height calculated by the three-dimensional positioning when the three-dimensional positioning section has performed the three-dimensional positioning.

Since the three-dimensional height is calculated by preliminary three-dimensional positioning, the three-dimensional height is highly accurate in a good reception environment such as an open sky environment. On the other hand, the three-dimensional height has poor accuracy in a poor reception environment such as a multipath environment.

Since the two-dimensional height is calculated using the estimated height, the two-dimensional height is calculated in a state in which the effects of a poor reception environment are reduced. Therefore, the two-dimensional height exhibits high accuracy in comparison with the three-dimensional height in a poor reception environment.

According to above embodiment, since the positioning device can appropriately select two-dimensional positioning or three-dimensional positioning based on the positioning environment, the positioning device can calculate an accurate located position corresponding to the reception environment.

Since the height included in the accurate located position has high accuracy, the estimated height can be made closer to the true height by updating the estimated height using the three-dimensional height calculated by three-dimensional positioning.

In the positioning device, the height selection section may select the two-dimensional height or the three-dimensional height based on a movement state of the positioning device and reliability of positioning information calculated in the two-dimensional positioning.

Even if the positioning device moves, the two-dimensional height exhibits high accuracy in comparison with the three-dimensional height when the reliability of the positioning information calculated by two-dimensional positioning is sufficient.

According to above embodiment, the height selection section can select the two-dimensional height or the three-dimensional height based on not only the movement state of the but also comparison between the reliability of the two-dimensional height and the reliability of the three-dimensional height.

The positioning device may comprise:

an estimated height evaluation section which determines whether or not the estimated height satisfies predetermined basic update conditions including at least a number of updates of the estimated height as a condition; and a difference-in-height calculation section which calculates a difference in height between the estimated height and the two-dimensional height or the three-dimensional height when the estimated height evaluation section has determined that the estimated height does not satisfy the basic update conditions;

wherein the updating section may update the estimated height by weighted averaging the two-dimensional height or the three-dimensional height selected by the height selection section and the estimated height stored in the estimated height storage section, and may update the estimated height while increasing weight of the estimated height when the difference in height is within a predetermined difference-in-height allowable range.

According to this configuration, the positioning device can update the estimated height even if the estimated height does not satisfy the basic update conditions.

It is considered that the estimated height is close to the true height when the difference in height is within a specific range. Specifically, the estimated height has high reliability. Therefore, the estimated height can be made close to the true height by updating the estimated height while increasing the weight of the estimated height.

According to above embodiment, since the updating section updates the estimated height while increasing the weight of the estimated height when the difference in height is within the difference-in-height allowable range, even if the basic update conditions are not satisfied, the estimated height can be made close to the true height.

In the positioning device, the updating section may update the estimated height while reducing the weight of the estimated height when the difference in height is not within the difference-in-height allowable range.

It is considered that the estimated height differ from the true height to a large extent when the difference in height is not within a specific range. Specifically, the estimated height has low reliability. Therefore, the estimated height can be made close to the true height by updating the estimated height while reducing the weight of the estimated height.

According to above embodiment, since the updating section updates the estimated height while reducing the weight of the estimated height when the difference in height is within the difference-in-height allowable range, even if the basic update conditions are not satisfied, the estimated height can be made close to the true height.

The positioning device may comprise: a gain table including a gain indicating the weight of the estimated height, and a gain counter for designating the gain.

According to this configuration, the updating section can change the gain by changing the gain counter.

In the positioning device, the updating section may update the estimated height based on the difference in height and a degree of positioning reliability.

According to another embodiment of the invention, there is provided a method of controlling a positioning device including an estimated height storage section which stores an estimated height and a signal reception section which receives a satellite signal which is a signal from a satellite positioning system (SPS) satellite, the method comprising:

calculating a height of a present position as a two-dimensional height by performing two-dimensional positioning which locates the present position based on the received satellite signals using the estimated height as a distance from the center of the earth;

calculating the height of the present position as a three-dimensional height by performing preliminary three-dimensional positioning which preliminarily locates the present position based on the received satellite signals without using the estimated height when performing the two-dimensional positioning;

selecting the two-dimensional height or the three-dimensional height for updating the estimated height stored in the estimated height storage section; and updating the estimated height stored in the estimated height storage section using selected one of the two-dimensional height and the three-dimensional height.

This allows accurate height information used for two-dimensional positioning to be acquired while reducing the storage load for holding height data and reducing the effects of poor positioning conditions during the preceding positioning, and allows the height information to be promptly updated.

According to a further embodiment of the invention, there is provided a computer-readable recording medium having a program recorded thereon, the program causing a computer included in a positioning device including an estimated height storage section which stores an estimated height and a signal reception section which receives a satellite signal which is a signal from a satellite positioning system (SPS) satellite to execute:

calculating a height of a present position as a two-dimensional height by performing two-dimensional positioning which locates the present position based on the received satellite signals using the estimated height as a distance from the center of the earth;

calculating the height of the present position as a three-dimensional height by performing preliminary three-dimensional positioning which preliminarily locates the present position based on the received satellite signals without using the estimated height when performing the two-dimensional positioning;

selecting the two-dimensional height or the three-dimensional height for updating the estimated height stored in the estimated height storage section; and updating the estimated height stored in the estimated height storage section using selected one of the two-dimensional height and the three-dimensional height.

Preferred embodiments of the invention are described below in detail with reference to the drawings.

The following embodiments illustrate specific preferred examples of the invention and are provided with various technologically preferred limitations. Note that the scope of the invention is not limited to the following embodiments unless there is a description limiting the invention.

FIG. 1 is a schematic view showing a positioning system 10 according to one embodiment of the invention.

As shown in FIG. 1, the positioning system 10 includes a terminal 20. The terminal 20 can receive signals S1, S2, S3, and S4 from GPS satellites 12a, 12b, 12c, and 12d (SPS satellites), for example. The signals S1 and the like exemplify satellite signals. The terminal 20 exemplifies a positioning device.

The terminal 20 is held by a user X and moves on a ground G.

The terminal 20 can perform three-dimensional positioning by receiving the signals S1, S2, S3, and S4 from four GPS satellites 12a, 12b, 12c, and 12d, and generate information indicating the coordinates of the present position using the latitude, the longitude, and the height, for example.

The terminal 20 can perform two-dimensional positioning by receiving the signals S1, S2, and S3 from three GPS satellites 12a, 12b, and 12c, for example. When performing two-dimensional positioning, the terminal 20 regards a center E of the earth as one satellite, and uses a height H as the pseudo-range between the center E and the terminal 20. The terminal 20 can generate information indicating the coordinates of the present position using the latitude, the longitude, and the height by two-dimensional positioning. The term "two-dimensional positioning" used herein refers to one type of three-dimensional positioning, as described above. In two-dimensional positioning, the center E of the earth is used instead of one GPS satellite, and the height H is used as the pseudo-range.

When performing two-dimensional positioning, the terminal 20 must obtain information indicating the height H in advance. The terminal 20 can perform two-dimensional positioning with higher accuracy as the height H becomes more accurate.

The height H is the distance between the center E of the earth and the terminal 20. The term "height" is hereinafter used to mean the distance between the center E of the earth and the terminal 20.

The terminal 20 is a portable telephone, for example. The terminal 20 may be a personal handy-phone system (PHS), a personal digital assistance (PDA), a car navigation system, or the like. Note that the terminal 20 is not limited thereto.

The number of GPS satellites 12a and the like is not limited to four. For example, the number of GPS satellites 12a and the like may be three or five or more, differing from this embodiment.

The SPS satellite is not limited to the GPS satellite used in this embodiment. The SPS satellite also includes a satellite for the Galileo system, a quasi-zenith satellite, and the like.

(Main Hardware Configuration of Terminal 20)

FIG. 2 is a schematic view showing the main hardware configuration of the terminal 20.

As shown in FIG. 2, the terminal 20 includes a computer which includes a bus 22.

A central processing unit (CPU) 24, a storage device 26, and the like are connected with the bus 22. The storage device 26 is a random access memory (RAM), a read only memory (ROM), or the like.

A input device 28 for inputting various types of information and the like and a GPS device 30 for receiving the signals S1 and the like from the GPS satellites 12a and the like are also connected with the bus 22. The GPS device 30 exemplifies a signal reception section.

A communication device 32 for communicating with the outside and a display device 34 for displaying various types of information are also connected with the bus 22.

(Main Software Configuration of Terminal 20)

Figure 3:
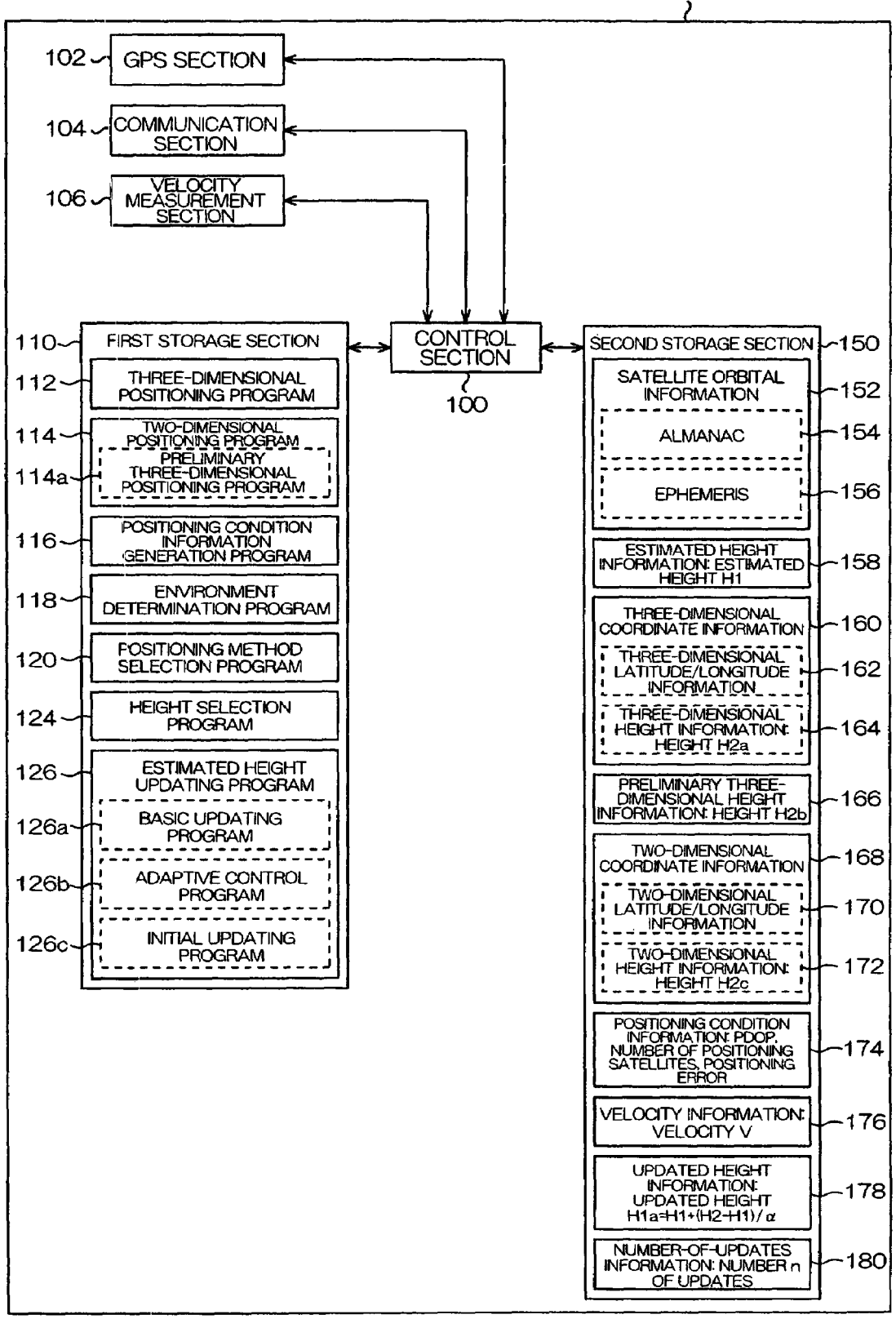
FIG. 3 is a schematic view showing the main software configuration of the terminal.

FIG. 3 is a schematic view showing the main software configuration of the terminal 20.

As shown in FIG. 3, the terminal 20 includes a control section 100 which controls each section, a GPS section 102 corresponding to the GPS device 30 shown in FIG. 2, a communication section 104 corresponding to the communication device 32, a velocity measurement section 106, and the like.

The velocity measurement section 106 generates velocity information 176 indicating the moving velocity of the terminal 20 based on the Doppler shift of the signals S1 and the like received by the GPS section 102 and the like (see paragraphs [0016] to [0018] of JP-A-8-68651, for example).

The control section 100 stores the velocity information 176 generated by the velocity measurement section 106 in a second storage section 150.

The terminal 20 includes a first storage section 110 which stores various programs, and the second storage section 150 which stores various types of information.

Note that the terminal 20 may include a velocimeter (hardware), and the moving velocity of the terminal 20 may be measured using the velocimeter, differing from this embodiment.

As shown in FIG. 3, the terminal 20 stores satellite orbital information 152 in the second storage section 150. The satellite orbital information 152 includes an almanac 154 and an ephemeris 155.

The almanac 154 is information indicating the approximate orbits of all of the GPS satellites 12a and the like (see FIG. 1). The almanac 154 is effective for seven days, for example. Therefore, the terminal 20 decodes and updates the almanac 154 from one of the signals S1 and the like from the GPS satellites 12a and the like every seven days.

The ephemeris 156 is information indicating the accurate orbit of each of the GPS satellites 12a and the like (see FIG. 1) together with the acquisition time. The effective period of the ephemeris 156 is four hours (h), for example. Therefore, the terminal 20 decodes and updates the ephemeris 156 of each of the observable GPS satellites 12a and the like every four hours.

As shown in FIG. 3, the terminal 20 stores one piece of estimated height information 158 indicating an estimated height H1 in the second storage section 150. The estimated height H1 exemplifies an estimated height. The estimated height information 158 exemplifies estimated height information. The second storage section 150 exemplifies an estimated height storage section.

The estimated height H1 is also called the height H1.

As shown in FIG. 3, the terminal 20 stores a three-dimensional positioning program 112 in the first storage section 110. The three-dimensional positioning program 112 is a program for causing the control section 100 to perform three-dimensional positioning based on the signals S1 and the like received by the GPS section 102. The three-dimensional positioning program 112 and the control section 100 exemplify a three-dimensional positioning section.

In more detail, the terminal 20 receives the signals S1 and the like from four GPS satellites 12a and the like, and calculates the pseudo-range (i.e. distance between each of the GPS satellites 12a and the like and the terminal 20) based on the delay time which is the difference between the time at which each of the signals S1 and the like is transmitted from the GPS satellites 12a and the like and the time at which each of the signals S1 and the like reaches the terminal 20. The terminal 20 calculates (locates) the present position using the ephemeris 156 of each of the GPS satellites 12a and the like and the pseudo-range.

Three-dimensional coordinate information 160 includes three-dimensional latitude/longitude information 162 indicating the latitude and the longitude of the present position of the terminal 20, and three-dimensional height information 164 indicating a height H2a of the present position of the terminal 20.

The control section 100 stores the generated three-dimensional coordinate information 160 in the second storage section 150.

As shown in FIG. 3, the terminal 20 stores a two-dimensional positioning program 114 in the first storage section 110. The two-dimensional positioning program 114 is a program for causing the control section 100 to perform two-dimensional positioning. The two-dimensional positioning program 114 and the control section 100 exemplify a two-dimensional height calculation section. The control section 100 performs two-dimensional positioning when the control section 100 selects two-dimensional positioning based on a positioning method selection program 120 described later.

As shown in FIG. 3, the two-dimensional positioning program 114 includes a preliminary three-dimensional positioning program 114a.

The preliminary three-dimensional positioning program 114a is a program for causing the control section 100 to perform three-dimensional positioning before two-dimensional positioning to calculate a height H2b of the present position of the terminal 20. Three-dimensional positioning performed based on the preliminary three-dimensional positioning program 114a is called preliminary three-dimensional positioning. The height H2b exemplifies a three-dimensional height. The preliminary three-dimensional positioning program 114a and the control section 100 exemplify a three-dimensional height calculation section. The height H2b is also called the three-dimensional height H2b.

The control section 100 stores preliminary three-dimensional height information 166 indicating the height H2b in the second storage section 150.

The control section 100 performs two-dimensional positioning using the height H1 based on a two-dimensional positioning program 114b after preliminary three-dimensional positioning.

The control section 100 calculates the latitude, the longitude, and a height H2c of the present position of the terminal 20 by performing two-dimensional positioning. The height H2c exemplifies a two-dimensional height. The height H2c is also called the two-dimensional height H2c.

In more detail, the terminal 20 receives the signals S1 and the like from three GPS satellites 12a and the like, and calculates the pseudo-range (i.e. distance between each of the GPS satellites 12a and the like and the terminal 20) based on the delay time which is the difference between the time at which each of the signals S1 and the like is transmitted from the GPS satellites 12a and the like and the time at which each of the signals S1 and the like reaches the terminal 20. The terminal 20 regards the center E (see FIG. 1) of the earth as one GPS satellite, and regards the estimated height H1 as the pseudo-range between the terminal 20 and the center E of the earth.

The terminal 20 calculates the position of each of the GPS satellites 12a and the like in the orbit at the present time using the ephemeris 156 of each of the GPS satellites 12a and the like. The position of the center E of the earth is known. The terminal 20 calculates (locates) the present position based on the position of each of the GPS satellites 12a and the like in the orbit, the position of the center E of the earth, the pseudo-range, and the estimated height H1. As described above, the terminal 20 uses the center E of the earth and the estimated height H1 for two-dimensional positioning. Therefore, the two-dimensional positioning results are affected by the estimated height H1.

The control section 100 generates two-dimensional coordinate information 168 by two-dimensional positioning, and stores the two-dimensional coordinate information 168 in the second storage section 150. The two-dimensional coordinate information 168 includes two-dimensional latitude/longitude information 170 indicating the latitude and the longitude, and two-dimensional height information 172 indicating the height 142c. The two-dimensional coordinate information 168 exemplifies positioning information.

The heights H2a, H2b, and H2c are generically called a height H2 or a positioning height H2.

It suffices that preliminary three-dimensional positioning be performed when performing two-dimensional positioning. Note that preliminary three-dimensional positioning may be performed after two-dimensional positioning, or may be performed in parallel with two-dimensional positioning, differing from this embodiment. Preliminary three-dimensional positioning may be continuously performed during a period from the commencement of two-dimensional positioning to calculation of the two-dimensional height H2c.

Specifically, since the reception state of the signals S1 and the like changes from moment to moment, the control section 100 may be able to perform three-dimensional positioning even if the control section 100 has selected two-dimensional positioning based on the positioning method selection program 120 described later. Specifically, the control section 100 performs preliminary three-dimensional positioning to calculate the three-dimensional height H2b, if possible, even if the control section 100 has selected two-dimensional positioning.

As shown in FIG. 3, the terminal 20 stores a positioning condition information generation program 116 in the first storage section 110. The positioning condition information generation program 116 is a program for causing the control section 100 to generate positioning condition information 174 indicating the positioning conditions when the control section 100 generates the three-dimensional coordinate information 160 and the two-dimensional coordinate information 168.

The positioning condition information 174 is information indicating the PDOP, the number of positioning satellites, and the positioning error, for example.

Note that the positioning condition information may be information indicating one or two of the PDOP, the number of positioning satellites, and the positioning error, differing from this embodiment.

In three-dimensional positioning, preliminary three-dimensional positioning, and two-dimensional positioning, each of the signals S1 and the like is received using a reception method (operation mode) corresponding to the field intensity (signal strength).

FIG. 4 is a view showing an example of the operation mode of the terminal 20.

As shown in FIG. 4, the terminal 20 can operate in a search mode M1, a first tracking mode M2, and a second tracking mode M3.

The search mode M1 is a mode for acquiring the signals S1 and the like. Therefore, the terminal 20 searches for a wide frequency range of 3 kHz in the search mode M1, for example.

The first tracking mode M2 (hereinafter called "mode M2") is a positioning mode in which the terminal 20 tracks the signals S1 and the like after acquiring the signals S1 and the like. The mode M2 is an operation mode (positioning mode) when the signal strength (field intensity) is high. The term "high signal strength" refers to a signal strength of −139 dBm or more, for example.

An accumulation time (incoherent time) t1 in the mode M2 is one second, for example.

The second tracking mode M3 (hereinafter called "mode M3") is a positioning mode in which the terminal 20 tracks the signals S1 and the like after acquiring the signals S1 and the like. The mode M3 is an operation mode (positioning mode) when the signal strength is low. The term "low signal strength" refers to a signal strength of −160 dBm or more and less than −139 dBm, for example.

An accumulation time (incoherent time) t2 in the mode M3 is two seconds, for example.

The accumulation time t2 in the mode M3 is longer than the accumulation time t1 in the mode M2.

The terminal 20 has a plurality of positioning modes with different operating signal strengths, as described above.

As shown in FIG. 3, the terminal 20 stores an environment determination program 118 in the first storage section 110. The environment determination program 118 is a program for causing the control section 100 to determine the positioning environment when performing three-dimensional positioning based on the first positioning program 112 and the positioning environment when performing two-dimensional positioning based on the two-dimensional positioning program 114. The environment determination program 118 and the control section 100 exemplify a positioning environment determination section.

FIGS. 5 and 6 are views illustrative of the process based on the environment determination program 118.

As shown in FIG. 5, the control section 100 classifies the field intensity (signal strength) of the signals S1 and the like into a strong electric field and a weak electric field based on the environment determination program 118. The strong electric field has a field intensity in which the terminal 20 operates in the mode M2. The weak electric field has a field intensity in which the terminal 20 operates in the mode M3.

The control section 100 classifies the strong electric field into a first strong electric field, a second strong electric field, and a third strong electric field.

The first strong electric field has a field intensity of a1 or more and less than a2. The second strong electric field has a field intensity of a2 or more and less than a3. The third strong electric field has a field intensity of a3 or more. a1, a2, and a3 are field intensity threshold values. a2 is greater than a1, and a3 is greater than a2. a1 is −140, for example. a2 is −130, for example. a3 is −124, for example.

The control section 100 classifies the weak electric field into a first weak electric field and a second weak electric field.

The first weak electric field has a field intensity of b1 or more and less than b2. The second weak electric field has a field intensity of b2 or more and less than b3. b1, b2, and b3 are field intensity threshold values. b2 is greater than b1, and b3 is greater than b2. b1 is −160 dBm, for example. b2 is −150 dBm, for example. b3 is −140 dBm, for example.

As shown in FIG. 6, the control section 100 classifies the positioning environment into a first environment to a ninth environment corresponding to the operation mode and the field intensity based on the environment determination program 114. The positioning specification is specified for each positioning environment.

As shown in FIG. 3, the terminal 20 stores the positioning method selection program 120 in the first storage section 110. The positioning method selection program 120 is a program for causing the control section 100 to select three-dimensional positioning or two-dimensional positioning based on the positioning environment. The positioning method selection program 120 and the control section 100 exemplify a positioning method selection section.

In more detail, the control section 100 selects two-dimensional positioning when the positioning environment is the third environment, the fourth environment, the fifth environment, the sixth environment, or the seventh environment, and a gain described later is 5 or more.

The third environment, the fourth environment, the fifth environment, the sixth environment, and the seventh environment are environments in which multipaths easily occur. The reliability of the height calculated by positioning is low in an environment in which multipaths occur. If the gain is 5 or more, the estimated height H1 has been updated a number of times equal to or greater than a specific number. Therefore, the estimated height H1 is considered to be stable at a value close to the true height.

The control section 100 selects three-dimensional positioning when the positioning environment is the first environment, the second environment, the eighth environment, or the ninth environment, or when the gain described later is less than 5.

Since the reception environment is excellent in the first environment and the second environment, the reliability of the height calculated by positioning is high. Therefore, three-dimensional positioning is suitable in comparison with two-dimensional positioning.

Since the reception environment is very poor in the eighth environment and the ninth environment, the reliability (accuracy) of the height calculated by positioning is extremely low. Therefore, if the estimated height H1 is continuously updated with the height calculated by positioning, the accuracy of the estimated height H1 deteriorates extremely. In this case, the height calculated by positioning has an accuracy higher than that of the estimated height H1 which has been updated a number of times with the inaccurate positioning height and of which the accuracy has extremely deteriorated, since the deterioration in accuracy is not accumulated. Accordingly, the control section 100 selects three-dimensional positioning in the eighth environment and the ninth environment. Specifically, although two-dimensional positioning and three-dimensional positioning exhibit poor accuracy in the eighth environment and the ninth environment, three-dimensional positioning is likely to exhibit an accuracy higher than that of two-dimensional positioning.

If the gain is less than 5, the number of updates of the estimated height H1 is insufficient. Therefore, the estimated height H1 is considered to differ from the true height to a large extent. Accordingly, the control section 100 selects three-dimensional positioning.

The conditions for selecting two-dimensional positioning are called "two-dimensional positioning execution conditions".

The control section 100 selects three-dimensional positioning or two-dimensional positioning based on the positioning environment, as described above. The control section 100 generates the three-dimensional coordinate information 160 or the two-dimensional coordinate information 168 corresponding to the selected three-dimensional positioning or two-dimensional positioning, and displays the three-dimensional coordinate information 160 or the two-dimensional coordinate information 168 on the display device 34.

The positioning height H2 for updating the estimated height H1 is selected and the estimated height H1 is updated while generating the coordinate information to be displayed on the display device 34, as described below.

As shown in FIG. 3, the terminal 20 stores a height selection program 124 in the first storage section 110. The height selection program 124 is a program for causing the control section 100 to select the positioning height H2 for updating the estimated height H1. The height selection program 124 and the control section 100 exemplify a height selection section.

The control section 100 selects the height H2a when three-dimensional positioning has been performed.

The control section 100 selects the height H2b or H2c when two-dimensional positioning has bee performed.

A configuration for the terminal 20 to select the height H2b or H2c when two-dimensional positioning is described below.

The control section 100 selects the height H2b or H2c based on the movement state of the terminal 20 and the reliability of the two-dimensional coordinate information 168.

In more detail, the control section 100 selects the height H2c when the terminal 20 does not move (stationary state). The control section 100 determines that the terminal 20 remains stationary when the velocity V indicated by the velocity information 176 is zero.

Since the true height does not change when the terminal 20 remains stationary, the effects of a poor reception environment can be reduced by using the height H2c.

On the other hand, the true height may change when the terminal 20 moves. Therefore, the control section 100 selects the height H2b or H2c based on the reliability of the two-dimensional coordinate information 168.

For example, the control section 100 determines that the two-dimensional coordinate information 168 has sufficient reliability when four or more satellites are used for positioning and the degree of convergence is less than a predetermined threshold value d1, and selects the height H2c. On the other hand, the control section 100 determines that the two-dimensional coordinate information 168 has insufficient reliability when four or more satellites are not used for positioning or the degree of convergence is equal to or greater than the predetermined threshold value d1, and selects the height H2b.

The degree of convergence is the degree of convergence of a position calculation, and is calculated in units of multiple position calculations performed during one positioning. A value indicating the degree of convergence decreases as the degree of convergence becomes higher. The degree of convergence used as the determination criterion is the degree of convergence of one position calculation selected from a plurality of position calculations.

The reliability of the two-dimensional coordinate information 168 increases as the number of satellites used for positioning becomes larger. Specifically, positioning calculations can be performed using a larger number of satellite sets as the number of satellites used for positioning becomes larger. The reliability of the two-dimensional coordinate information 168 increases as the degree of convergence becomes higher.

A configuration for the terminal 20 to update the estimated height H1 is described below.

As shown in FIG. 3, the terminal 20 stores an estimated height updating program 126 in the first storage section 110. The estimated height updating program 126 is a program for causing the control section 100 to update the height H1 based on the height H2a, H2b, or H2c. The estimated height updating program 126 and the control section 100 exemplify an updating section.

The estimated height updating program 126 includes a basic updating program 126a, an adaptive control program 126b, and an initial updating program 126c.

The control section 100 determines whether or not basic update conditions are satisfied based on the estimated height updating program 126. The basic update conditions are conditions for the terminal 20 to update the estimated height H1 by changing a gain counter by one corresponding to the moving velocity and performing adaptive control under specific conditions. This update process is called a basic update process. The basic update process may be performed when the estimated height H1 has specific reliability. Therefore, the basic update conditions are conditions for the estimated height H1 to have specific reliability. The basic update conditions are specified in advance. The basic update conditions are conditions whereby the estimated height has been updated five times or more and the gain is 5 or more, for example. It is considered that the estimated height H1 is close to the true height if the above conditions are satisfied.

The basic update conditions are not limited to the above conditions. For example, the basic update conditions may be conditions whereby the estimated height has been updated three times or more and the gain is 5 or more.

The estimated height updating program 126 and the control section 100 also exemplify an estimated height evaluation section.

When the estimated height H1 satisfies the basic update conditions, the control section 100 updates the estimated height H1 based on the basic updating program 126a and the adaptive control program 126b, as described below.

The initial updating program 126c is an updating program executed when the basic update conditions are not satisfied.

The basic updating program 126a is described below.

The basic updating program 126a is a program for causing the control section 100 to perform the basic update process described below.

The control section 100 determines the weight alpha (hereinafter called "gain alpha") of the estimated height H1 with respect to the height H2a and the like when updating the height H1 based on the height H2a, H2b, or H2c.

FIG. 7 is a view showing an example of the process based on the basic updating program 126a.

The basic update process described below is performed when the estimated height H1 satisfies the basic update conditions.

Figures 7A, 7B, 7C:
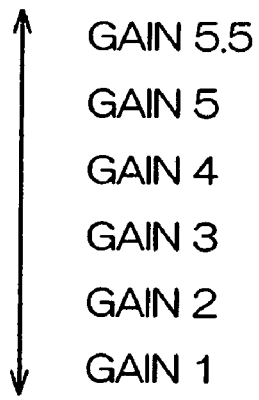
FIGS. 7A to 7C are views illustrative of a process based on a basic updating program.

As shown in FIG. 7A, the terminal 20 stores a gain table including a gain counter and a gain as the basic updating program 126a. The gain is information indicating the weight of the estimated height H1. The gain counter is information for designating the gain. The gain determination program 126 sets the gain counter to 5 (gain alpha=3.5) as an initial setting, for example.

When the estimated height H1 satisfies the basic update conditions, the control section 100 increases the gain counter by one to increase the gain alpha when the velocity V indicated by the velocity information 176 is equal to or less than 60 kilometers per hour (km/h) (hereinafter called "principle operation"). For example, the control section 100 sets the gain counter to 6 (gain alpha=4) in the first update operation. The control section 100 sets the gain counter to 7 (gain alpha=4.5) in the second update operation. As described above, the control section 100 increases the gain alpha as the number of updates of the estimated height H1 increases. Note that the term "increasing the gain alpha" is also referred to as "enhancing the gain alpha". Note that the term "reducing the gain alpha" is also referred to as "weakening the gain alpha". The control section 100 gradually increases the gain by increasing the gain counter by one each time the estimated height H1 is updated. This allows the estimated height H1 to gradually approach the true height.

When the velocity V indicated by the velocity information 176 is not equal to or less than 60 kilometers per hour (km/h), the control section 100 decreases the gain counter by one when updating the estimated height H1. This allows the estimated height H1 to be updated by incorporating the element of the new positioning height H2 or the like while minimizing the effects of the positioning height H2 when updating the height H1.

As shown in FIG. 7B, the updated estimated height H1 becomes closer to the held estimated height H1 as the gain alpha becomes greater. The updated estimated height H1 becomes closer to the height H2 as the gain alpha becomes smaller. Therefore, the terminal 20 increases the gain counter when it is appropriate to increase the weight of the estimated height H1, and decreases the gain counter when it is appropriate to increase the weight of the positioning height H2.

As the gain determination method, one gain may be allocated to two values of the gain counter, as shown in FIG. 7C, differing from this embodiment.

The control section 100 updates the estimated height H1 with the height H2a, H2b, or H2c using the set gain alpha.

In more detail, the control section 100 updates the estimated height H1 using the set gain alpha, and calculates the updated height H1a. The updated height H1a is used as the new estimated height H1.

The control section 100 stores updated height information 178 indicating the updated height H1a in the second storage section 150. In the specification, the term "calculation of the updated height H1a" is synonymously used with the term "update of the estimated height H1".

The updated height H1a indicated by the updated height information 178 is calculated by H1a=H1+(H2−H1)/alpha, for example.

When the control section 100 has generated the updated height information 178, the control section 100 increases the number of updates n indicated by the number-of-updates information 180 by one.

The adaptive control program 126b is described below.

The adaptive control program 126b is a program for causing the control section 100 to change only the update method from the basic update process based on the difference in height dH and the degree of positioning reliability while maintaining the gain counter. Control based on the adaptive control program 126b is performed during the above basic update process.

The degree of positioning reliability is a value indicating the degree of positioning reliability during positioning for calculating the height H2b or H2c, and is specified by the positioning error, the positional dilution of precision (PDOP), the number of satellites used for positioning, and the like. The degree of positioning reliability is indicated by seven-grade indices (0, 1, 2, 3, 4, 5, 6, and 7), for example. The smaller the value, the higher the degree of reliability. The threshold value d2 is "2" (second grade). The index becomes smaller as the positioning error becomes smaller. The index becomes smaller as the PDOP becomes smaller. The index becomes smaller as the number of satellites used for positioning becomes larger.

The control section 100 determines whether or not gain temporary change conditions are satisfied based on the adaptive control program 126b. The gain temporary change conditions are conditions for changing the gain so that the gain is applied to only the present update operation of the estimated height H1. The gain temporary change conditions are satisfied when the currently calculated height H2 has high reliability (e.g. the number of satellites used for positioning is five or more and the PDOP is three or less).

When the control section 100 has determined that the positioning conditions satisfy the gain temporary change conditions, the control section 100 decreases the gain by one while maintaining the gain counter. Therefore, when the present height H2 has high reliability, the gain can be temporarily changed corresponding to the reliability of the height H2. This allows the estimated height H1 to be updated while reflecting the reliability of the height H2 which changes from moment to moment.

When the control section 100 has determined that the positioning conditions do not satisfy the gain temporary change conditions, the control section 100 maintains the gain.

The control section 100 then calculates the difference in height dH between the estimated height H1 and the height H2b or H2c selected based on the height selection program 124 based on the adaptive control program 126b. When the degree of positioning reliability is high, the estimated height H1 should be updated while increasing the effects of the positioning height H2. However, even if the degree of positioning reliability calculated during positioning is high, the degree of positioning reliability is not reliable when the difference in height dH is large. Therefore, the effects of the positioning height H2 on the update of the estimated height H1 should be reduced.

Therefore, when the difference in height dH is equal to or greater than 1000 meters (m) and the index is equal to or greater than the specific threshold value d2, the control section 100 adds 1/64th of the difference in height dH to the estimated height H1 and updates the estimated height H1. This allows the estimated height H1 to be updated while decreasing the effects of the positioning height H2 when the difference in height dH is large while taking the effects of the positioning height H2 into consideration to some extent. This prevents a situation in which the estimated height H1 rapidly changes away from the true value.

When the difference in height dH is equal to or greater than 1000 meters (m) and the index is less than the specific threshold value d2, the control section 100 adds ¼th of the difference in height dH to the estimated height H1 and updates the estimated height H1. This allows the effects of the positioning height H2 to be increased when the degree of positioning reliability of the positioning height H2 is high.

When the basic update conditions are satisfied and the reliability of the estimated height H1 is high, if the degree of positioning reliability is equal to or greater than the threshold value d2 and the difference in height between the estimated height H1 and the height H2 is as large as 1000 meters, the estimated height H1 can be made close to the true height by updating the estimated height H1 while reducing the effects of the height H2 and taking the effects of the height H2 calculated by positioning into consideration.

When updating the estimated height H1 depending the reliability of the height H2, the reliability of the height H2 is determined based on whether or not the index indicating the degree of positioning reliability is larger than the threshold value d2. The reliability of the height H2 is increased when the index is smaller than the threshold value d2, and the reliability of the height H2 is decreased when the index is larger than the threshold value d2.

When the terminal 20 has determined that the index is equal to or larger than the threshold value d2, the terminal 20 adds ¹⁄₆₄th of the difference in height to the estimated height H1, as described above.

When the terminal 20 has determined that the index is less than the threshold value d2, the terminal 20 adds ¼th of the difference in height to the estimated height H1.

When the difference in height dH is equal to or greater than 500 meters (m) and the degree of positioning reliability is equal to or greater than the threshold value d2, the control section 100 adds ¹⁄₃₂nd of the difference in height dH to the estimated height H1 and updates the estimated height H1.

When the difference in height dH is equal to or greater than 500 meters (m) and the degree of positioning reliability is less than the threshold value d2, the control section 100 adds half of the difference in height dH to the estimated height H1 and updates the estimated height H1.

When the difference in height dH is equal to or greater than 500 meters (m), the reliability of the height H2 is high in comparison with the case where the difference in height is equal to or greater than 1000 meters (m). In this case, the index indicating the degree of positioning reliability is small. Therefore, the control section 100 adds ¹⁄₃₂nd of the difference in height dH to the estimated height H1 instead of ¹⁄₆₄th of the difference in height dH in order to increase the effects of the height H2 in comparison with the case where the difference in height is equal to or greater than 1000 meters (m).

When the difference in height dH is equal to or greater than 100 meters (m) and the degree of positioning reliability is equal to or greater than the threshold value d2, the control section 100 adds ¹⁄₁₆th of the difference in height dH to the estimated height H1 and updates the estimated height H1.

When the difference in height dH is equal to or greater than 100 meters (m) and the degree of positioning reliability is less than the threshold value d2, the control section 100 adds half of the difference in height dH to the estimated height H1 and updates the estimated height H1.

The initial updating program 126c is described below.

The control section 100 calculates the difference in height dH between the estimated height H1 and the height H2b or H2c selected based on the height selection program 124 based on the initial updating program 126c. The initial updating program 126c and the control section 100 exemplify a difference-in-height calculation section.

When the difference in height dH is less than h (threshold value) meters (m), the control section 100 updates the height H1 by averaging the estimated height H1 and the height H2. The threshold value h is 50 meters (m), for example. When the difference in height is less than 50 meters (m), it is considered that the estimated height H1 has a specific degree of reliability. Therefore, the control section 100 updates the estimated height H1 while taking the held estimated height H1 into consideration.

The control section 100 increases the gain counter corresponding to the degree of positioning reliability. The degree of positioning reliability is determined based on the number of satellites used for positioning and the positioning error. For example, when the number of satellites used for positioning is five or more and the positioning error is 30 meters (m) or less, the control section 100 increases the gain counter by two. Specifically, the gain is increased to a large extent in comparison with the basic update process in which the gain is increased by one. Therefore, the gain can be promptly increased to a specific value (e.g. 5). This allows the basic update conditions to be promptly satisfied.

When the control section 100 has determined that the difference in height dH is equal to or greater than h (threshold value) meters (m), the control section 100 updates the height H1 using the height H2 as the estimated height H1. It is considered that the estimated height H1 is not reliable when the basic update conditions are not satisfied and the difference in height dH is equal to or greater than the threshold value h. Therefore, the control section 100 updates the estimated height H1 without taking the held estimated height H1 into consideration.

The control section 100 then initializes the gain counter. Specifically, the control section 100 sets the gain counter to "5" (i.e. initial setting). The control section 100 may set the gain counter in the value that is less than "5". For example, when the number of satellites used for positioning is five or more and the positioning error is 30 meters(m) or less, the control section 100 sets the gain counter to "2". Otherwise, the control section 100 sets the gain counter to "1". Therefore, the gain counter can be promptly increased to a specific value.

The estimated height H1 is updated as described above.

Figure 8:
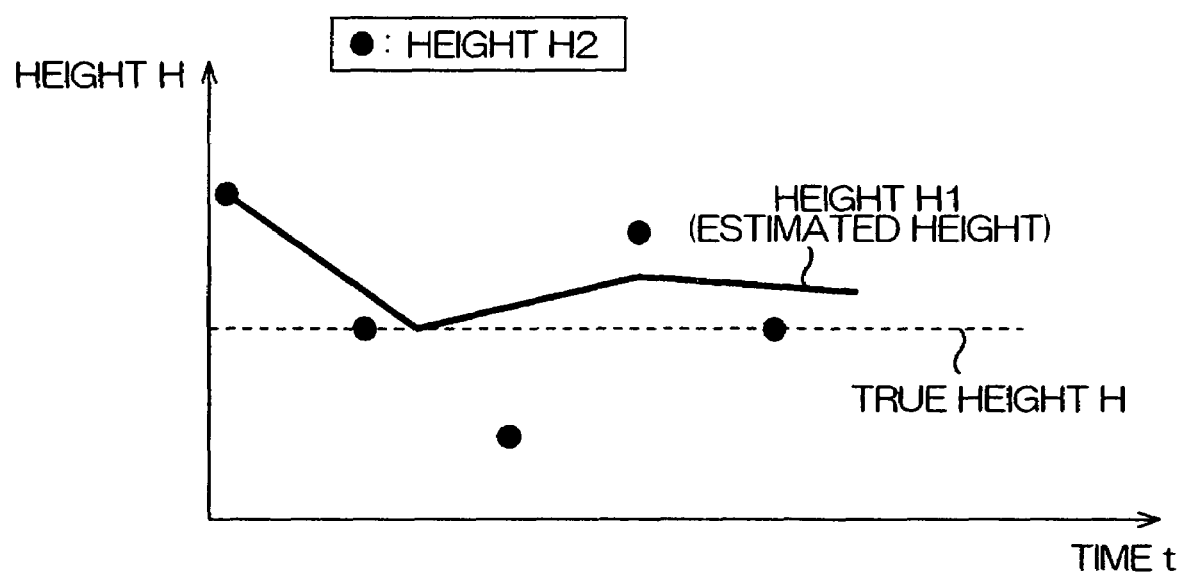
FIG. 8 is a view showing an example of a state in which height information is updated.

FIG. 8 is a view showing an example of a state in which the height information 158 is updated.

As shown in FIG. 8, the height H1 indicated by the height information 158 approaches the true height H and becomes stable near the true height H as the number of updates with the height H2 increases.

The positioning system 10 is configured as described above.

As described above, the terminal 20 can calculate the two-dimensional height H2c. Therefore, the terminal 20 can calculate the height even if the two-dimensional positioning execution conditions are satisfied (e.g. when three-dimensional positioning is not appropriate).

The terminal 20 can calculate the three-dimensional height H2b by preliminary three-dimensional positioning when performing two-dimensional positioning. There may be a case where three-dimensional positioning can be performed, even if three-dimensional positioning is not appropriate. The three-dimensional height H2b may be appropriate for updating the estimated height H1 even if two-dimensional positioning is appropriate for calculating the located position and outputting the information to the display device 34.

One of the features of this embodiment is to perform preliminary three-dimensional positioning when performing two-dimensional positioning. The number of satellite sets which can be used for positioning is increased in two-dimensional positioning in comparison with three-dimensional positioning as long as the two-dimensional positioning execution conditions are satisfied, whereby the positioning accuracy is improved. Specifically, while four satellites are necessary for one positioning calculation of three-dimensional positioning, only three satellites are necessary for one positioning calculation of two-dimensional positioning. In three-dimensional positioning, it may be necessary to use a satellite signal with a poor reception state (e.g. signal strength is weak) in order to provide satellites in a number necessary for the positioning calculation. On the other hand, since the number of satellites necessary for the positioning calculation of two-dimensional positioning is reduced to three, a satellite signal with a poor reception state may be excluded, whereby the positioning accuracy is improved.

The three-dimensional height H2b calculated by preliminary three-dimensional positioning may be used to update the estimated height H1 for the following reason. Specifically, since the estimated height H1 used for two-dimensional positioning is calculated by positioning and changes to only a small extent, the followability of the height may deteriorate. Therefore, the followability with respect to a change in the true height is improved using the three-dimensional height H2b calculated by preliminary three-dimensional positioning.

Therefore, the terminal 20 calculates the two-dimensional height H2c and the three-dimensional height H2b. This increases the degrees of freedom of selection of the height for updating the estimated height H1.

The terminal 20 can selectively use the height H2a, H2b, or H2c for updating the estimated height H1.

In two-dimensional positioning, the center of the earth is regarded as one satellite and used for positioning. Specifically, two-dimensional positioning is performed on the assumption that the estimated height H1 is the pseudo-range between the center of the earth and the terminal 20. Therefore, two-dimensional positioning exhibits higher positioning accuracy when the accuracy of the estimated height H1 is high.

However, since it is considered that the true height changes in a reception state such as when the terminal 20 moves at a velocity equal to or higher than a specific velocity, three-dimensional positioning which does not use the estimated height H1 provides excellent followability with respect to the true movement state, whereby the positioning accuracy is increased.

Therefore, even if the estimated height H1 is nearly accurate, the accuracy of the height H2c calculated by preliminary three-dimensional positioning may be higher than that of the height H2c calculated by two-dimensional positioning depending on the reception state.

The terminal 20 can select the height H2b or H2c depending on the reception environment during two-dimensional positioning, for example.

When the terminal 20 has performed three-dimensional positioning, the terminal 20 can select the height H2a.

The terminal 20 can update the height H1 using the height H2a, H2b, or H2c. Specifically, even if three-dimensional positioning is not appropriate, the terminal 20 can update the height H1 using the height H2a, H2b, or H2c having relatively high reliability. Therefore, the terminal 20 can promptly update the height H1.

Since the height H2 is new information generated by positioning, the height H1 which has been held is corrected by new information by updating the height H1 using the height H2. This enables the height H1 to be made closer to the true height.

Moreover, since the terminal 20 can calculate the two-dimensional height H2c and the three-dimensional height H2b and select a more suitable height, the estimated height H1 can be further made closer to the true height.

Since the terminal 20 can hold and update only one estimated height H1, the load imposed on the storage for holding the height data is reduced.

Therefore, the terminal 20 allows a reduction in load imposed on the storage for holding the height data, ensures acquisition of accurate height information used for two-dimensional positioning while reducing the effects of poor positioning conditions during the preceding positioning, and allows the height information to be promptly updated.

The terminal 20 updates the estimated height H1 in the basic update process while increasing the gain alpha as the number of updates of the estimated height H1 increases.

After the accurate height information has been obtained as a result of updating the height H1 a number of times, although it is necessary to update the height H1 using the new height H2, the accuracy of the height H1 can be increased by reducing the weight of the new height H2 and increasing the weight of the height H1.

Since the terminal 20 updates the height H1 while increasing the weight of the height H1 which has been held as the number of updates of the height H1 increases, the height H1 can be made more accurate.

The terminal 20 updates the height H1 while increasing the gain alpha when the moving velocity V is within a predetermined velocity allowable range, and updates the height H1 while reducing the gain alpha when the moving velocity V is not within the velocity allowable range.

In general, when an object moves on the surface of the earth, the amount of vertical movement is small when the object moves at a low speed in comparison with the case where the object moves at a high speed. In other words, when an object moves on the surface of the earth, the amount of vertical movement is large when the object moves at a high speed in comparison with the case where the object moves at a low speed.

Therefore, the accuracy of the height H1 can be increased by reducing the weight of the new height H2 and increasing the weight of the height H1 when the terminal 20 moves at a low speed in comparison with the case where the terminal 20 moves at a high speed.

The terminal 20 updates the height H1 while increasing the gain alpha when the terminal 20 moves at a low speed in comparison with the case where the terminal 20 moves at a high speed. The terminal 20 updates the height H1 while reducing the gain alpha when the terminal 20 moves at a high speed in comparison with the case where the terminal 20 moves at a low speed. Therefore, the terminal 20 can update the height H1 with a gain alpha corresponding to the velocity to increase the accuracy of the height H1.

The terminal 20 can update the height H1 using the gain alpha set based on the positioning conditions and the moving velocity. Since the height H2 is new information generated by positioning, the height H1 is corrected by new information by updating the height H1 using the height H2. This enables the height indicated by the height H1 to be made closer to the true height.

The terminal 20 can determine whether or not the basic update conditions are satisfied depending on the number of updates of the height H1.

When the number of updates of the height H1 is 5 or more and the gain is 5 or more, the terminal 20 can generate the two-dimensional coordinate information 168 by performing two-dimensional positioning based on the signals S1 and the like from the GPS satellite 12a and the height H1. The accuracy of the height H1 can increased by updating the height H1 using the new height H2. The error of each height H2 is reduced by updating the height H1 a number of times. Therefore, the height H1 after being updated five times or more is close to the true height. Accordingly, the positioning accuracy of two-dimensional positioning using the resulting height H1 is increased. When the gain has reached 5 or more, the reliability of the estimated height H1 has been increased.

Two-dimensional positioning using the accurate height H1 exhibits higher positioning accuracy than that of three-dimensional positioning. Specifically, since the number of sets of observable GPS satellites 12a and the like used for positioning is larger for two-dimensional positioning than for three-dimensional positioning, positioning results more accurately indicating the present position can be selected from a number of positioning results. For example, when the number of observable GPS satellites 12a and the like is five, since three-dimensional positioning uses four or more GPS satellites for one positioning calculation, the number of sets of GPS satellites which may be used for positioning is six in total (i.e. five sets of four GPS satellites and one set of five GPS satellites). On the other hand, when the number of observable GPS satellites 12a and the like is five, since two-dimensional positioning uses three or more GPS satellites for one positioning calculation, the number of sets of GPS satellites which may be used for positioning is sixteen in total (i.e. ten sets of three GPS satellites, five sets of four GPS satellites, and one set of five GPS satellites).

When the number of updates of the height H1 is within a two-dimensional positioning allowable count, the two-dimensional coordinate information 168 generated by two-dimensional positioning using the updated height H1 is accurate position information close to the true position.

The configuration of the positioning system 10 according to this embodiment has been described above. An operation example of the positioning system 10 is described below mainly using FIGS. 9 to 12.

FIGS. 9 to 12 are schematic flowcharts showing an operation example of the positioning system 10 according to this embodiment.

The operation in which the terminal 20 updates the height H1 with the height H2 is also called filtering. The gain alpha is also called the filtering gain alpha.

In FIGS. 9 to 12, the terminal 20 has received the signals S1 and the like from the GPS satellites 12a and the like and continuously locates the position. FIGS. 9 to 12 shows the method of updating the height H1 during positioning.

Figure 9:
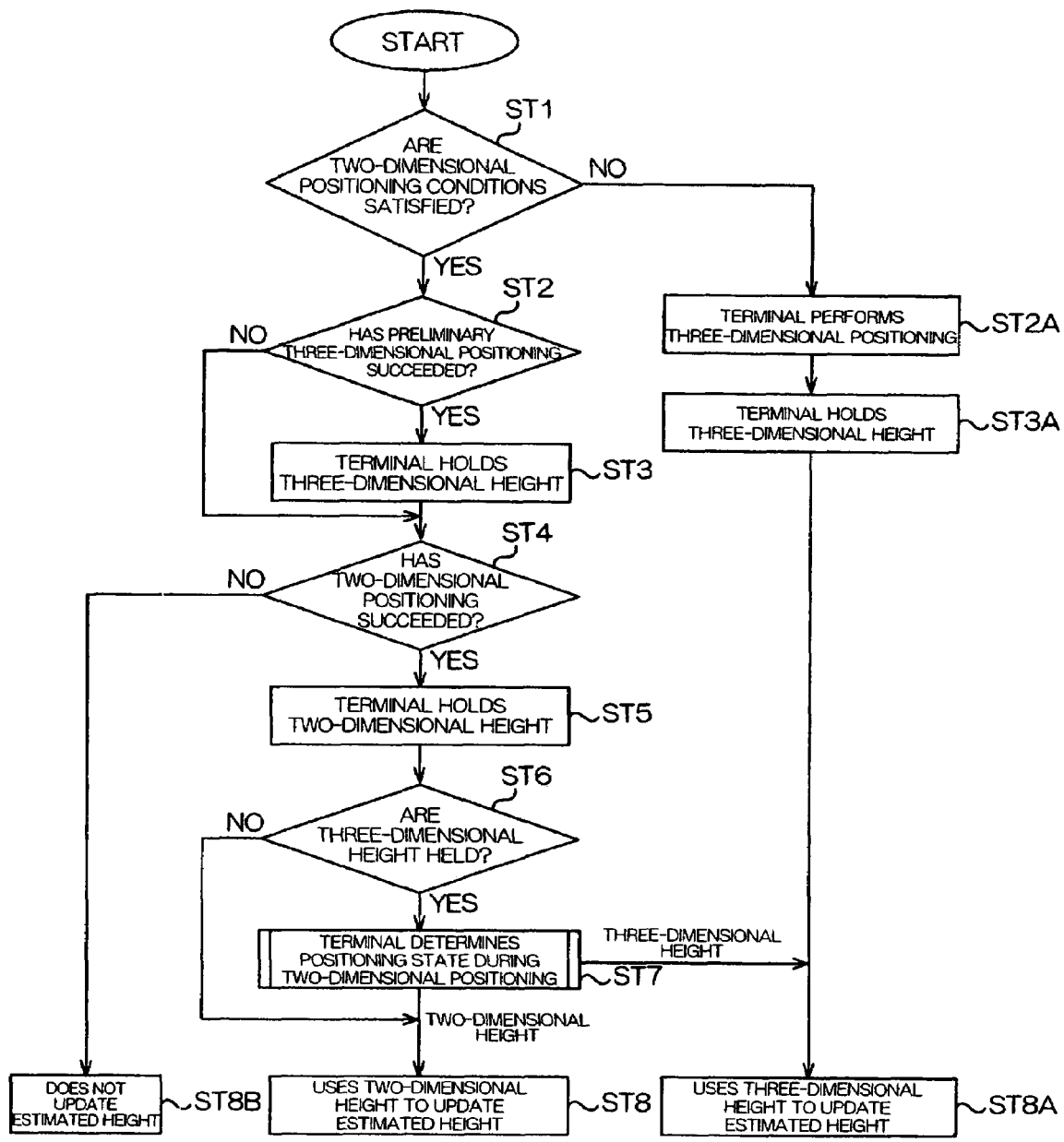
FIG. 9 is a schematic flowchart showing an operation example of the positioning system.

The terminal 20 determines whether or not the two-dimensional positioning execution conditions are satisfied (step ST1 in FIG. 9).

When the terminal 20 has determined that the two-dimensional positioning execution conditions are not satisfied, the terminal 20 performs three-dimensional positioning (step ST2A), and holds the three-dimensional height H2a (step ST3A). The terminal 20 uses the three-dimensional height H2a for updating the estimated height H1 (step ST8A).

When the terminal 20 has determined that the two-dimensional positioning execution conditions are satisfied in the step ST1, the terminal 20 performs preliminary three-dimensional positioning and determines whether or not preliminary three-dimensional positioning has succeeded (step ST2). The terminal 20 determines that preliminary three-dimensional positioning has succeeded when the positioning calculation has been completed and the located position has been calculated. The step ST2 exemplifies a three-dimensional height calculation step.

When the terminal 20 has determined that preliminary three-dimensional positioning has succeeded, the terminal 20 holds the three-dimensional height H2b (step ST3).

The terminal 20 then performs two-dimensional positioning, and determines whether or not two-dimensional positioning has succeeded (step ST4). The terminal 20 determines that two-dimensional positioning has succeeded when the positioning calculation has been completed and the located position has been calculated. The step ST4 exemplifies a two-dimensional height calculation step.

When the terminal 20 has determined that preliminary three-dimensional positioning has not succeeded in the step ST2, the three-dimensional height H2b cannot be calculated. Therefore, the terminal 20 proceeds to the step ST4.

When the terminal 20 has determined that two-dimensional positioning has succeeded, the terminal 20 holds the two-dimensional height H2c (step ST5).

When the terminal 20 has determined that two-dimensional positioning has not succeeded, the terminal 20 does not update the estimated height H1 (step ST8B). Since positioning has failed when two-dimensional positioning has not succeeded, the estimated height H1 cannot be updated.

The terminal 20 determines whether or not the terminal 20 holds the three-dimensional height H2b after the step ST5 (step ST6). When the terminal 20 has determined that the terminal 20 does not hold the three-dimensional height H2b, the terminal 20 uses the two-dimensional height H2c for updating the estimated height H1 (step ST8).

When the terminal 20 has determined that the terminal 20 holds the three-dimensional height H2b in the step ST6, the terminal 20 determines the positioning state during two-dimensional positioning (step ST7). The terminal 20 selects the two-dimensional height H2c or the three-dimensional height H2b in this step ST7 in order to update the estimated height H1. The step ST7 exemplifies a height selection step.

The details of the step ST7 are described below with reference to FIG. 10.

Figure 10:
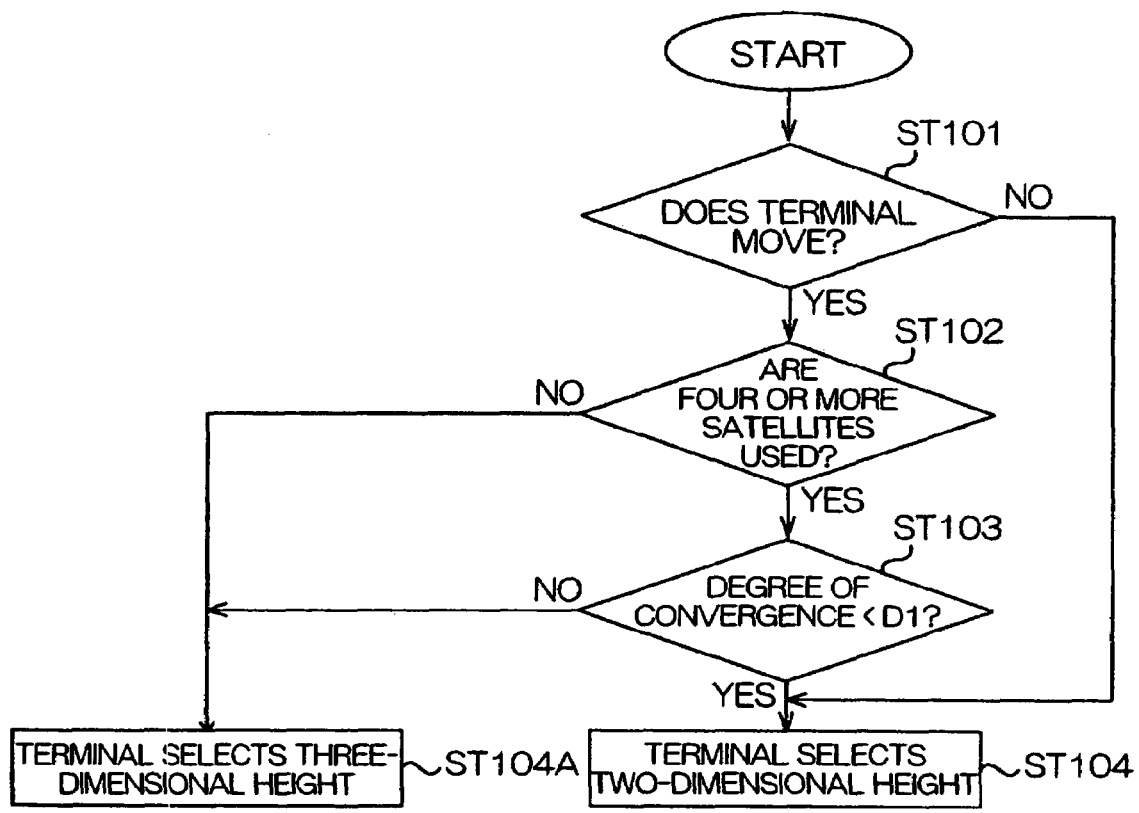
FIG. 10 is a schematic flowchart showing an operation example of the positioning system.

The terminal 20 determines whether or not the terminal 20 moves (step ST100 in FIG. 10).

When the terminal 20 has determined that the terminal 20 does not move, the terminal 20 selects the two-dimensional height H2c (step ST104).

When the terminal 20 has determined that the terminal 20 moves, the terminal 20 determines whether or not four or more satellites are used (step ST102).

When the terminal 20 has determined that four or more satellites are not used, the terminal 20 selects the three-dimensional height H2b (step ST104A).

When the terminal 20 has determined that four or more satellites are used, the terminal 20 determines whether or not the degree of convergence of the position calculation is less than the threshold value d1 (step ST103).

When the terminal 20 has determined that the degree of convergence is not less than the threshold value d1, the terminal 20 selects the three-dimensional height H2b (step ST104A).

When the terminal 20 has determined that the degree of convergence is less than the threshold value d1, the terminal 20 selects the two-dimensional height H2c (step ST104).

The terminal 20 can select the height H2 used to update the estimated height H1 by the above steps ST1 to ST8 (8A, 8B). Or, the terminal 20 can determine that the terminal 20 does not update the estimated height H1.

The method of updating the estimated height H1 is described below with reference to FIGS. 11 and 12.

Figure 11:
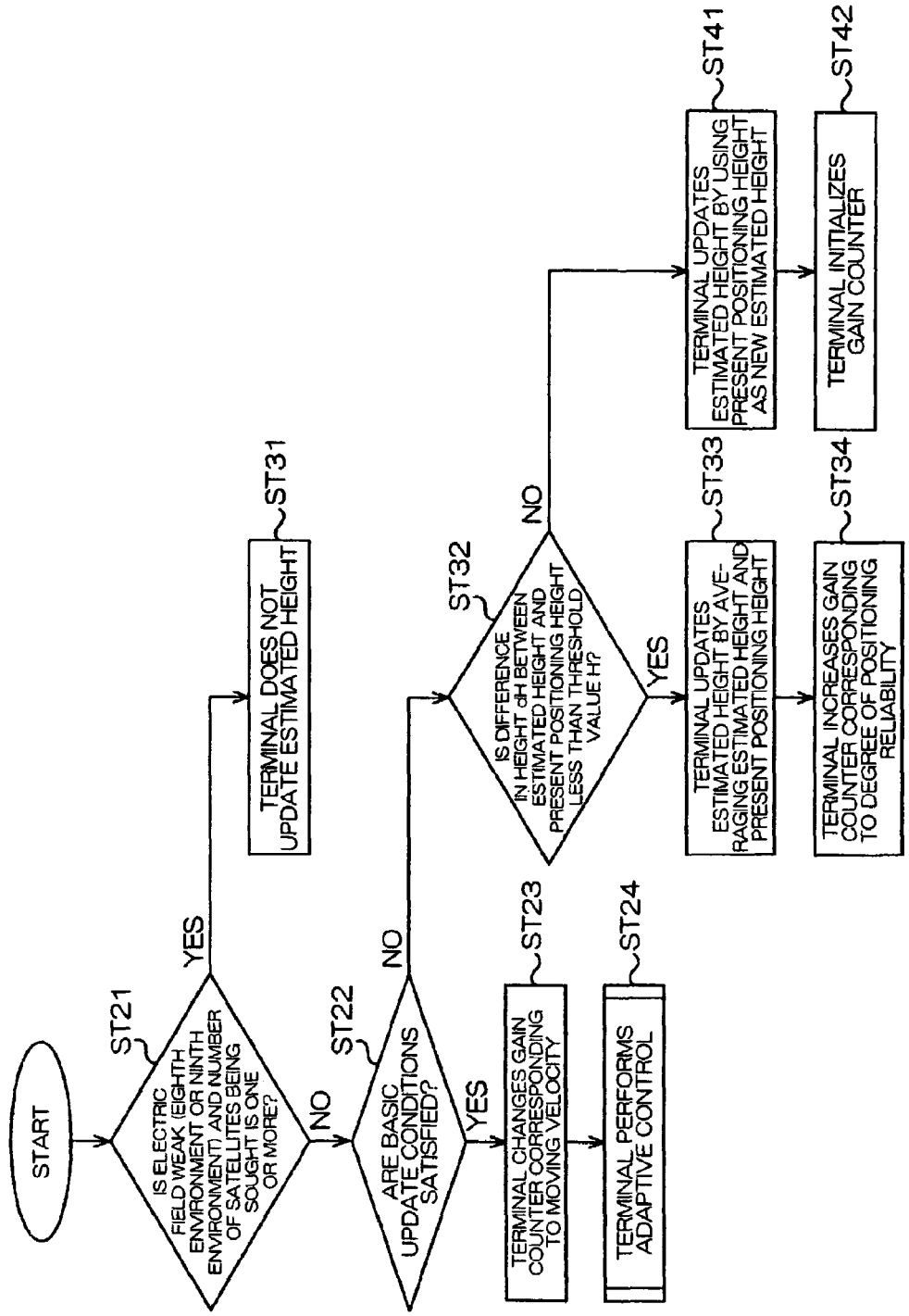
FIG. 11 is a schematic flowchart showing an operation example of the positioning system.

The terminal 20 determines whether or not the electric field is weak and the number of satellites which are being sought is one or more (step ST21 in FIG. 11). The step ST21 is a step following the step ST8 or ST8A (see FIG. 9). The term "satellite which is being sought" refers to a satellite of which the signal S1 or the like has not be acquired the terminal 20 and which has not been tracked by the terminal 20. The term "weak electric field" refers to the eighth environment and the ninth environment. Even if the measurement (code phase and signal strength) of the satellite which is being sought is calculated, the reliability of the measurement is low.

When the terminal 20 has determined that the electric field is weak and the number of satellites which are being sought is one or more in the step ST21, the terminal 20 does not update the estimated height H1 (step ST31). Since the reliability of the calculated height H2 is low under such conditions, the reliability of the estimated height H1 can be maintained by maintaining the held estimated height H1. Since the degree of positioning reliability of the height H2 is considerably low in a weak electric field, the accuracy of the estimated height H1 deteriorate is the estimated height H1 is updated using the height H2, When the terminal 20 has determined that the electric field is not weak and the number of satellites which are being sought is not one or more, the terminal 20 determines whether or not the basic update conditions are satisfied (step ST22).

When the terminal 20 has determined that the basic update conditions are not satisfied, the terminal 20 performs the following temporary update operation without performing the basic update process.

The terminal 20 determines whether or not the difference in height between the estimated height H1 and the present height H2 is less than the threshold value h (50 meters (m)) (step ST32).

When the terminal 20 has determined that the difference in height is less than the threshold value h, the terminal 20 updates the height H1 by averaging the estimated height H1 and the height H2 (step ST33). The step ST33 exemplifies an updating step.

The terminal 20 increases the gain counter corresponding to the degree of positioning reliability (step ST34).

When the terminal 20 has determined that the difference in height is not less than the threshold value h in the step ST32, the terminal 20 updates the height H1 by using the height H2 as the estimated height H1 (step ST41). The step ST41 also exemplifies the updating step. It is considered that the estimated height H1 is not reliable when the basic update conditions are not satisfied and the difference in height is equal to or greater than h (50 meters (m)) meters (m). Therefore, the terminal 20 updates the estimated height H1 without taking the held estimated height H1 into consideration.

The terminal 20 initializes the gain counter (step ST42). Specifically, the terminal 20 sets the gain counter to "3" (see FIG. 7A).

When the terminal 20 has determined that the basic update conditions are satisfied in the step ST22, the terminal 20 changes the gain counter corresponding to the moving velocity (step ST23).

The terminal 20 performs adaptive control (step ST24).

Figure 12:
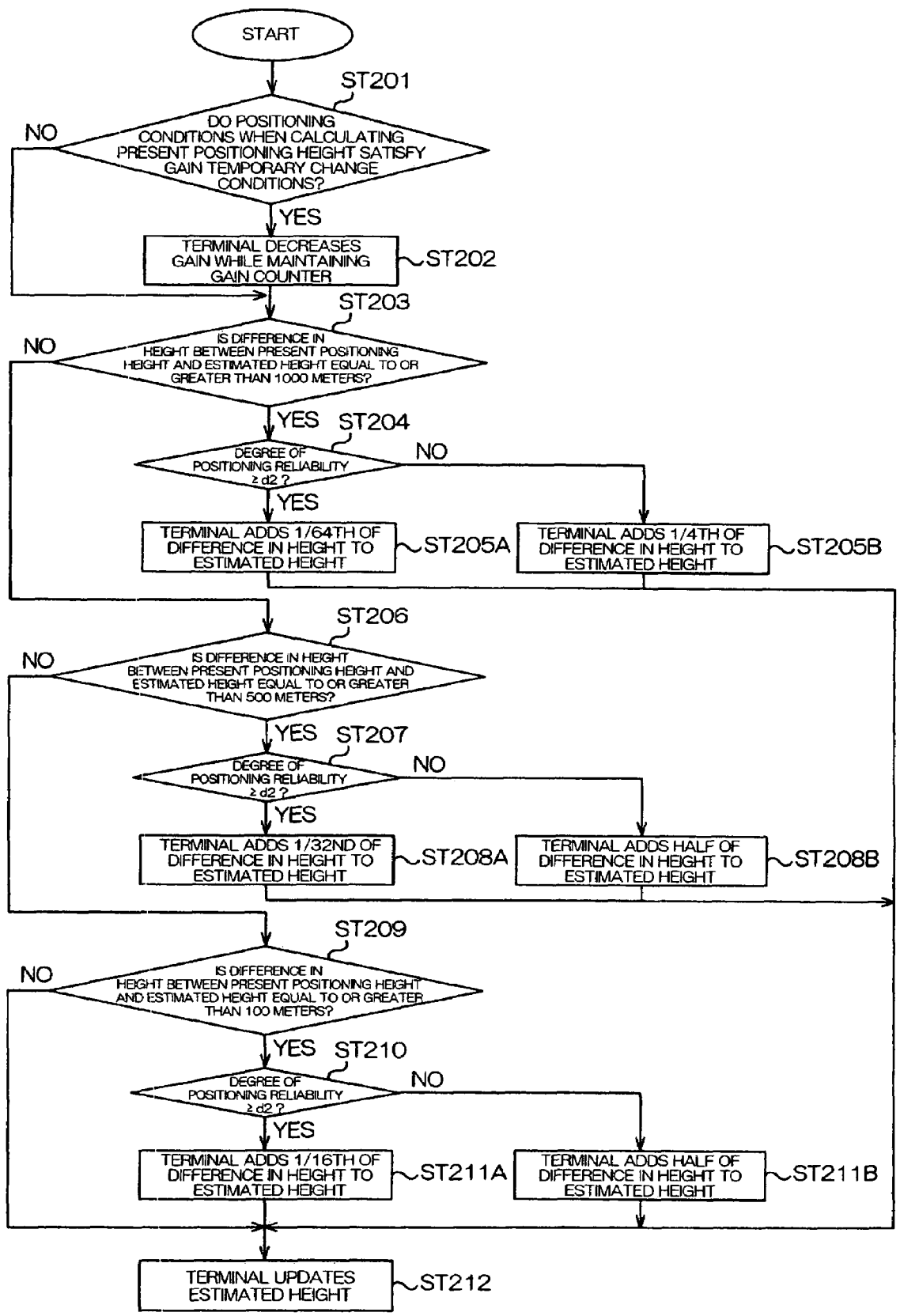
FIG. 12 is a schematic flowchart showing an operation example of the positioning system.

The terminal 20 determines whether or not the positioning conditions when calculating the present height H2 satisfy the gain temporary change conditions (step ST201 in FIG. 12).

When the terminal 20 has determined that the positioning conditions satisfy the gain temporary change conditions, the terminal 20 decreases the gain by one while maintaining the gain counter (step ST202).

The terminal 20 proceeds to a step ST203. When the terminal 20 has determined that the positioning conditions do not satisfy the gain temporary change conditions in the step ST201, the terminal 20 proceeds to the step ST203.

The terminal 20 determines whether or not the difference in height between the present height H2 and the estimated height H1 is equal to or greater than 1000 meters (m) (step ST203).

When the terminal 20 has determined that the difference in height is equal to or greater than 1000 meters (m), the terminal 20 determines whether or not the degree of positioning reliability is equal to or greater than the threshold value d2 (step ST204). The degree of positioning reliability is the degree of positioning reliability the present two-dimensional positioning or three-dimensional positioning.

When the terminal 20 has determined that the degree of positioning reliability is equal to or greater than the threshold value d2, the terminal 20 add 1/64th of the difference in height to the estimated height H1 (step ST205A).

When the terminal 20 has determined that the degree of positioning reliability is less than the threshold value d2, the terminal 20 adds 1/4th of the difference in height to the estimated height H1 (step ST205B).

When the terminal 20 has determined that the difference in height is not equal to or greater than 1000 meters (m) in the step ST203, the terminal 20 determines whether or not the difference in height from the estimated height H1 is equal to or greater than 500 meters (m) (step ST206).

When the terminal 20 has determined that the difference in height is equal to or greater than 500 meters (m), the terminal 20 determines whether or not the degree of positioning reliability is equal to or greater than the threshold value d2 (step ST207).

When the terminal 20 has determined that the degree of positioning reliability is equal to or greater than the threshold value d2, the terminal 20 add 1/32nd of the difference in height to the estimated height H1 (step ST208A).

When the terminal 20 has determined that the degree of positioning reliability is less than the threshold value d2, the terminal 20 adds half of the difference in height to the estimated height H1 (step ST208B).

When the terminal 20 has determined that the difference in height is not equal to or greater than 500 meters (m) in the step ST206, the terminal 20 determines whether or not the difference in height from the estimated height H1 is equal to or greater than 100 meters (m) (step ST209).

When the terminal 20 has determined that the difference in height is equal to or greater than 100 meters (m), the terminal 20 determines whether or not the degree of positioning reliability is equal to or greater than the threshold value d2 (step ST210).

When the terminal 20 has determined that the degree of positioning reliability is equal to or greater than the threshold value d2, the terminal 20 add 1/16th of the difference in height to the estimated height H1 (step ST211A).

When the terminal 20 has determined that the degree of positioning reliability is less than the threshold value d2, the terminal 20 adds half of the difference in height to the estimated height H1 (step ST211B).

The terminal 20 updates the estimated height H1 (step ST212). The step ST212 also exemplifies an updating step.

When the positioning conditions satisfy the gain temporary change conditions, the terminal 20 decreases the gain while maintaining the gain counter, as described above.

In the step ST212, when the difference in height is equal to or greater than 100 meters (m), the estimated height H1 is changed in advance corresponding to the difference in height and then updated. On the other hand, when the difference in height is less than 100 meters (m), the estimated height H1 is updated without being changed in advance.

Therefore, the above steps allow accurate height information used for two-dimensional positioning to be acquired while reducing the storage load for holding height data and reducing the effects of poor positioning conditions during the preceding positioning. Moreover, the height information can be promptly updated.

(Program, Computer-Readable Recording Medium, and the Like)

A program for controlling a positioning device may be provided which causes a computer to execute the first height calculation step, the second height calculation step, the height selection step, the updating step, and the like of the above-described operation example.

A computer-readable recording medium having such a program for controlling a positioning device recorded thereon and the like may also be provided.

A program storage medium used to install the program for controlling a positioning device and the like in a computer to allow the program and the like to be executable by the computer may be implemented by a packaging medium such as a flexible disk such as a floppy disk (registered trademark), a compact disc read only memory (CD-ROM), a compact disc-recordable (CD-R), a compact disc-rewritable (CD-RW), or a digital versatile disc (DVD), a semiconductor memory, a magnetic disk, or a magnetooptical disk in which the program is stored temporarily or permanently, or the like.

The invention is not limited to the above embodiments. The above embodiments may be configured in combination.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning device comprising:
    an estimated height storage section which stores an estimated height;
    a signal reception section which receives a satellite signal which is a signal from a satellite positioning system (SPS) satellite;
    a two-dimensional height calculation section which calculates a height of a present position as a two-dimensional height by performing two-dimensional positioning which locates the present position based on the received satellite signals using the estimated height as a distance from the center of the earth;
    a three-dimensional height calculation section which calculates the height of the present position as a three-dimensional height by performing preliminary three-dimensional positioning which preliminarily locates the present position based on the received satellite signals without using the estimated height when performing the two-dimensional positioning;
    a height selection section which selects the two-dimensional height or the three-dimensional height for updating the estimated height stored in the estimated height storage section; and
    an updating section which updates the estimated height stored in the estimated height storage section using the two-dimensional height or the three-dimensional height selected by the height selection section.

2. The positioning device as defined in claim 1, comprising:
    a three-dimensional positioning section which performs three-dimensional positioning which locates the present position based on the received satellite signals without using the estimated height;
    a positioning environment determination section which determines a positioning environment when performing the two-dimensional positioning or the three-dimensional positioning; and
    a positioning method selection section which selects the two-dimensional positioning or the three-dimensional positioning based on the positioning environment;
    wherein the updating section updates the estimated height using the three-dimensional height calculated by the three-dimensional positioning when the three-dimensional positioning section has performed the three-dimensional positioning.

3. The positioning device as defined in claim 1, wherein the height selection section selects the two-dimensional height or the three-dimensional height based on a movement state of the positioning device and reliability of positioning information calculated in the two-dimensional positioning.

4. The positioning device as defined in claim 1, comprising:
    an estimated height evaluation section which determines whether or not the estimated height satisfies predetermined basic update conditions including at least a number of updates of the estimated height as a condition; and
    a difference-in-height calculation section which calculates a difference in height between the estimated height and the two-dimensional height or the three-dimensional height when the estimated height evaluation section has determined that the estimated height does not satisfy the basic update conditions;
    wherein the updating section updates the estimated height by weighted averaging the two-dimensional height or the three-dimensional height selected by the height selection section and the estimated height stored in the estimated height storage section, and updates the estimated height while increasing weight of the estimated height when the difference in height is within a predetermined difference-in-height allowable range.

5. The positioning device as defined in claim 1, wherein the updating section updates the estimated height while reducing the weight of the estimated height when the difference in height is not within the difference-in-height allowable range.

6. The positioning device as defined in claim 4, comprising: a gain table including a gain indicating the weight of the estimated height, and a gain counter for designating the gain.

7. The positioning device as defined in claim 1, wherein the updating section updates the estimated height based on the difference in height and a degree of positioning reliability.

8. The positioning device as defined in claim 6, wherein the updating section updates the estimated height based on the difference in height and a degree of positioning reliability.

9. A method of controlling a positioning device including an estimated height storage section which stores an estimated height and a signal reception section which receives a satellite signal which is a signal from a satellite positioning system (SPS) satellite, the method comprising:
    calculating a height of a present position as a two-dimensional height by performing two-dimensional positioning which locates the present position based on the received satellite signals using the estimated height as a distance from the center of the earth;
    calculating the height of the present position as a three-dimensional height by performing preliminary three-dimensional positioning which preliminarily locates the present position based on the received satellite signals without using the estimated height when performing the two-dimensional positioning;

selecting the two-dimensional height or the three-dimensional height for updating the estimated height stored in the estimated height storage section; and updating the estimated height stored in the estimated height storage section using selected one of the two-dimensional height and the three-dimensional height.

10. A computer-readable recording medium having a program recorded thereon, the program causing a computer included in a positioning device including an estimated height storage section which stores an estimated height and a signal reception section which receives a satellite signal which is a signal from a satellite positioning system (SPS) satellite to execute:

calculating a height of a present position as a two-dimensional height by performing two-dimensional positioning which locates the present position based on the received satellite signals using the estimated height as a distance from the center of the earth;

calculating the height of the present position as a three-dimensional height by performing preliminary three-dimensional positioning which preliminarily locates the present position based on the received satellite signals without using the estimated height when performing the two-dimensional positioning;

selecting the two-dimensional height or the three-dimensional height for updating the estimated height stored in the estimated height storage section; and updating the estimated height stored in the estimated height storage section using selected one of the two-dimensional height and the three-dimensional height.

* * * * *